United States Patent [19]
Perttula

[11] Patent Number: 5,682,926
[45] Date of Patent: Nov. 4, 1997

[54] CHANNEL SYSTEM WITH A CROSS-SECTION WITH ROUNDED CORNERS AND METHOD FOR MANUFACTURING ELEMENTS THEREIN

[76] Inventor: Jukka Perttula, Myllypurontie 18, FIN-33450 Siivikkala, Finland

[21] Appl. No.: 284,598

[22] PCT Filed: Feb. 11, 1993

[86] PCT No.: PCT/FI93/00038

§ 371 Date: Oct. 3, 1994

§ 102(e) Date: Oct. 3, 1994

[87] PCT Pub. No.: WO93/16313

PCT Pub. Date: Aug. 19, 1993

[30] Foreign Application Priority Data

Feb. 13, 1992 [FI] Finland ................................ 920605

[51] Int. Cl.⁶ .......................................................... F16L 9/00
[52] U.S. Cl. ........................... 138/157; 138/156; 174/101
[58] Field of Search .................................. 138/157, 156, 138/162, 163, 116, 117; 174/101

[56] References Cited

U.S. PATENT DOCUMENTS 1,959,756  5/1934  Ferm .
2,389,468  11/1945  Terry ........................... 138/163 X
2,912,013  11/1959  Freyholdt et al. .
3,761,603  9/1973  Hays et al. ........................ 138/157 X
4,383,822  5/1983  Schatschneider ................... 138/162 X
4,627,469  12/1986  Buard ............................... 174/101 X
5,359,143  10/1994  Simon ............................... 138/157 X

FOREIGN PATENT DOCUMENTS

497/71    11/1979  Finland .
74402     5/1970   Germany ........................... 138/162
2 003 139 7/1971   Germany .
2 011 054 9/1971   Germany .
1 301 858 1/1973   United Kingdom .
1 552 916 9/1979   United Kingdom .

*Primary Examiner*—David Scherbel
*Assistant Examiner*—Patrick F. Brinson
*Attorney, Agent, or Firm*—Pollock, Vande Sande & Priddy

[57] ABSTRACT

A thin wall system for providing a channel includes a plurality of planar basic parts for forming planar wall parts of the system, and a plurality of arcuate basic parts. The arcuate basic parts extend in a longitudinal direction and curve in a transverse direction for forming arched wall parts of the system. The arched wall parts are attached to the planar wall parts along their edges in the longitudinal direction for forming straight segments of the channel which includes rounded corners provided by the arched wall parts.

7 Claims, 3 Drawing Sheets

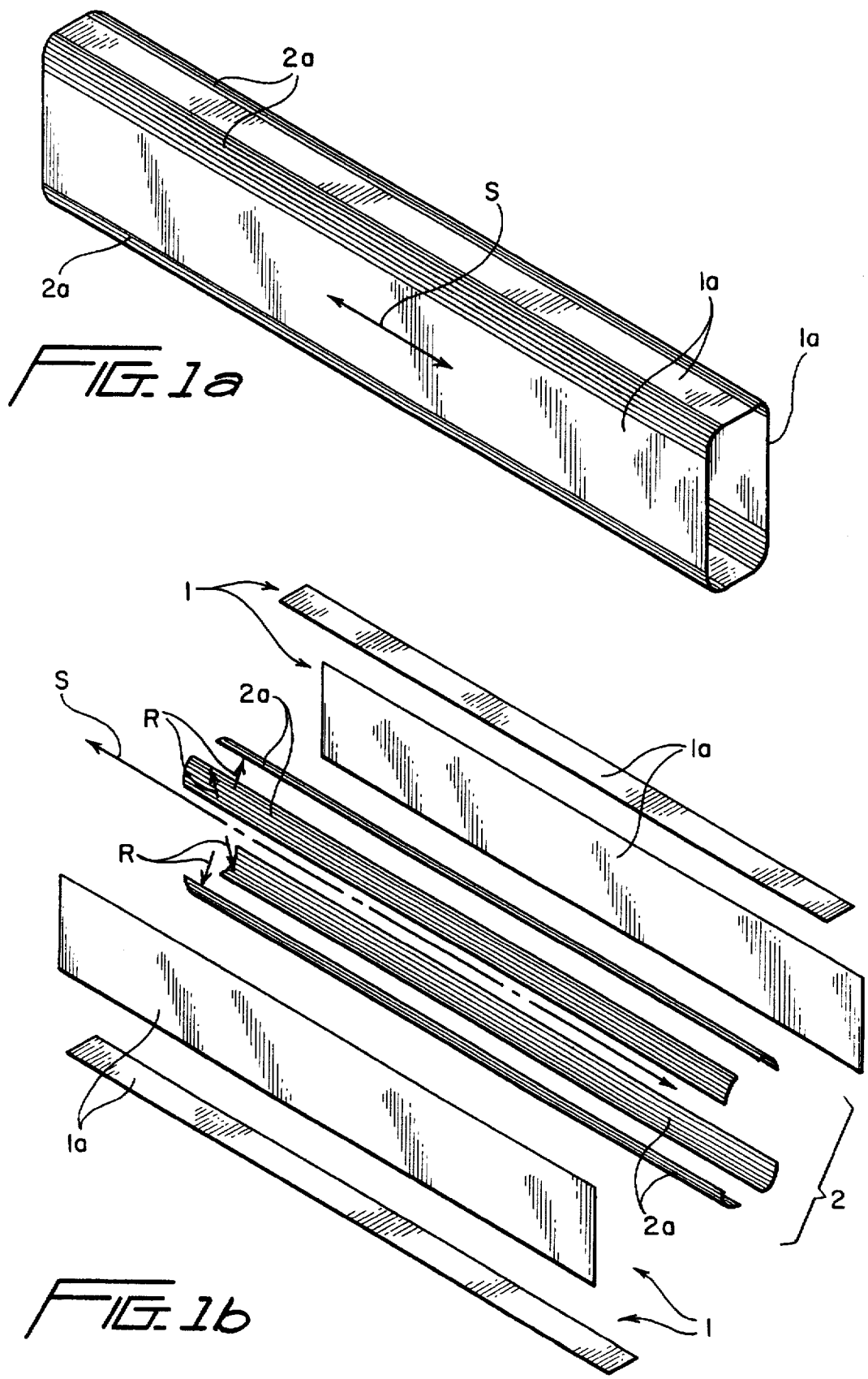

CHANNEL SYSTEM WITH A CROSS-SECTION WITH ROUNDED CORNERS AND METHOD FOR MANUFACTURING ELEMENTS THEREIN

FIELD OF THE INVENTION

This invention relates to a channel system having a cross-section with rounded corners, and comprising various elements, such as straight, branch, corner, reducing fittings and the like. The elements have planar and arched, for example, convex, concave or corresponding walls, and are manufactured of a material preferably with thin walls, such as sheet metal, plastic or the like. For achieving a cross-section with rounded corners, at least some of the elements of the channel system are formed by using joining arrangements to connect at least arched wall parts with each other, preferably along the edges thereof, whereby the elements connected with each other form a flow or wiring channel or the like.

BACKGROUND OF THE INVENTION

Particularly as flow channels, channels having a cross-section with rounded corners are more advantageous than acute-angled, for example, rectangular or quadratic channels. In a channel with acute angles, the flow is naturally not evenly distributed onto all parts of the wall, as compared with a channel with rounded corners, but turbulence is induced by acute angles. Thus, for example, in ordinary ventilation systems, impurities are slowly accumulated in the ducts.

Commonly used channels with rounded corners are spiral tubes which are manufactured for each standardized tube size. In a channel system made of spiral tubes, the various branch, corner, reducing and corresponding fittings are manufactured by applying ordinary sheet working techniques. Thus the manufacture of the elements requires good professional skills and/or specially tailored equipment, such as molds, templates or the like. For manufacturing reasons, it is usually necessary to provide certain elements of a channel system having a cross-section with otherwise rounded corners with partly sharp edges, whereby it is not possible to maintain the advantageous cross-section with rounded corners in all parts. Naturally, for different elements needed for each tube size, tools for each size must be used. In practice, such channel systems made of spiral tubes usually have a clumsy general appearance due to use of elements manufactured with most various techniques and skills.

The publications GB-1,301,858 and GB-1,552,916 disclose elements formed by planar parts joined together, which are applicable for use in a channel system with having a cross-section with sharp edges. GB-1,301,858 presents a fireproof channel element, the wall being formed by flat plates joined together by corrosion-resistant connecting means fixed at the inner edges and the outer surfaces of the joints being welded. GB-1,552,916 presents a solution for forming the walls of an element of flat plates notched and bent into a right angle, which are fixed to each other by U-shaped connecting means and support frames. The solutions of both publications are only applicable for manufacturing elements having a cross-section with sharp edges. Further, the application requires precise dimensioning of the wall parts and the use of particular connecting means. Consequently, these solutions are demanding with respect to both their manufacturing, to secure sufficient compatibility of elements, and their installation, because several operations are needed.

Finnish Patent Application No. 497/71 presents a method and device for connecting elements in ventilation systems with high requirements for tightness. The method presented in the publication can also be applied for manufacturing elements of a channel system with a cross-section having rounded corners. The publication relates to manufacturing elements of separate wall surfaces, their edges being equipped with joint arrangements. The joint arrangements are formed by a U-shaped joint part at the edge of another wall surface, the edge of the opposite wall surface being placed therebetween. The publication discloses applications with a cross-section with rounded corners of a straight element, a T-branch and an angle of 90°, each being formed by two arched wall surfaces placed against each other. The joint solution presented in the publication is useful in principle, bun it does not, however, offer a comprehensive solution for manufacturing elements with different shapes and sizes.

Consequently, it is not possible to manufacture different parts of a channel system by present techniques in a way that all parts of the channel system are based on a cross-sectional shape with rounded corners. Thus, for channel systems presently manufactured, combinations must usually be made of both rounded and angulated components, whereby the whole system is displeasing in appearance. Aiming at a uniform appearance, the costs of manufacturing rise to an extremely high level when present solutions are applied, because separate tools are needed for each size and shape.

SUMMARY OF THE INVENTION

It is a purpose of the channel system having a cross-section with rounded corners according to the present invention to achieve a decisive improvement over the disadvantages of the prior art presented above and thus to substantially improve the state of prior art in the field. For achieving this aim, the channel system having a cross-section with rounded corners according to the present invention is primarily characterized in that the elements of the channel system, having different sizes and/or shapes, are formed by combining basic parts forming wall parts with planar and arched shapes, such as convex, concave or the like.

The most important advantages of the channel system of the invention are the simplicity and uniformity of the basic parts used therein, whereby the entire channel system with elements of different sizes and shapes can be composed of the same basic parts. There is thus no need, for example, to manufacture separate tools to correspond to each element size or shape as in the presently known methods. The channel system of the invention is thus also uniform in appearance, and has, most preferably, rounded corners in all elements.

The invention relates also to a method for manufacturing elements of a channel system of the above type.

The method of the present invention makes it possible to manufacture elements of the channel system by a simple set of tools, because a uniform channel system of the invention can be composed of basic parts having the same basic shapes. The elements of different sizes and shapes are formed simply by combining planar basic parts and arched basic parts, the latter being most preferably made in only three shapes. The application of the method does not require difficult or additional operations, but all elements can be assembled and joined to each other by simple joining arrangements suitable for each purpose.

In the following description, the invention is illustrated in detail with reference to the appended drawings. In the drawings,

3

BRIEF DESCRIPTION OF THE DRAWINGS

FIG. 1a shows an example of a straight element of a channel system according to the present invention;

FIG. 1b is an exploded view of the element shown in FIG. 1a;

FIG. 2b is a partial exploded view of the corner fitting shown in FIG. 2a;

DETAILED DESCRIPTION OF THE PREFERRED EMBODIMENT

Figure 2A:
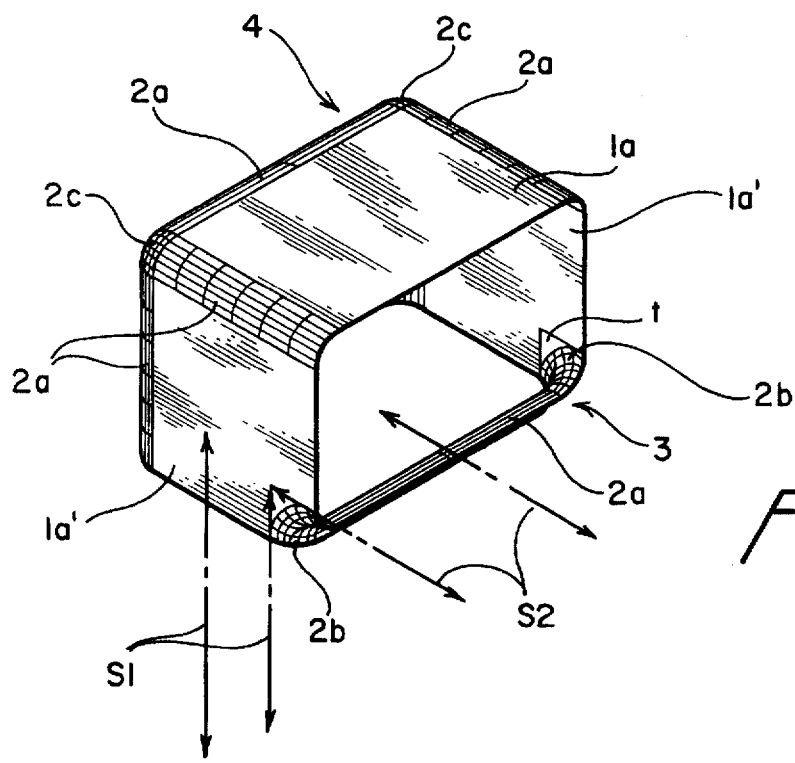
FIG. 2a shows a corner piece in a 90° angle.

The embodiments shown in FIGS. 1 to 4 are examples of a channel system of the invention having a cross-section with rounded corners and including different elements, such as straight, branch, corner, reducing fittings and/or the like. The elements have planar walls 1 and arched walls 2, such as convex, concave or corresponding walls, and they are preferably manufactured of a thin material, such as sheet metal, plastic or the like. For achieving a cross-section with rounded corners, the elements of the channel system are formed by connecting at least arched wall parts 2 by their edges with each other using joining arrangements, wherein the elements connected with each other form a flow or wiring channel or the like. The elements of the channel system having different sizes and/or shapes according to the invention are formed by combining basic parts 1a, 2a, 2b, 2c forming planar and arched wall parts 1 and 2.

A closed channel having a cross-section with rounded corners is shown in FIG. 1a and in an exploded view in FIG. 1b. The planar wall parts 1 of the channel are formed by first basic parts which in this embodiment are rectangular flat plates 1a. The arched wall parts 2 are formed by second basic parts 2a which extend in the longitudinal direction s and are arched in the transverse direction, thus forming the rounded corners of the channel as their longitudinal edges are attached to plates 1a.

Figure 2B:
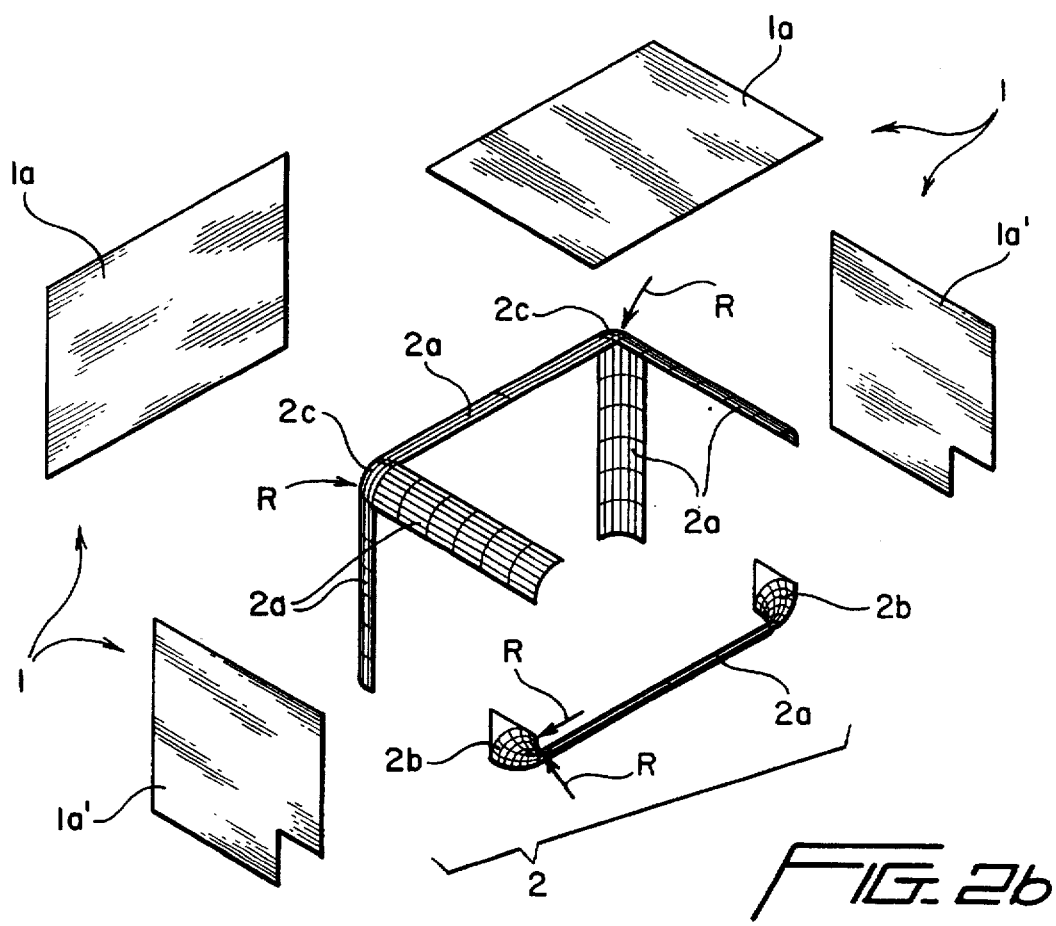

A corner piece at a 90° angle is shown in FIG. 2a and in an exploded view in FIG. 2b. The edges of the internal angle 3 of the piece are formed by third basic parts 2b joining the two longitudinal directions s1, s2 in an arch and arranged in the transverse direction in an arch. These third basic parts 2b are connected at their first edges to a second basic part 2a and at their second edges to side plates 1a'.

Further, the edges of the external angle 4 of the corner piece are formed by fourth basic parts 2c which are continuously arched and connected at their edges to second basic parts 2a. The upper and back walls of the piece are formed by flat plates 1a joined with second basic parts.

For achieving an advantageous assembly of a channel system according to the invention, the arches of the edges of second 2a, third 2b and fourth 2c basic parts forming arched wall parts 2, to be connected with each other, are formed using a substantially equal radius of curvature R.

As shown in FIGS. 2a and 2b, one edge of each third basic part 2b to be joined with a side plate 1a' is arranged to join the plane t defined by the side plate 1a' in an arch. Further, this edge is formed by two flat edge parts in angles deviating from each other in the plane t. The angle between the longitudinal directions s1, s2 being 90° in the case in question, it is most advantageous to elect the angle between

4 the straight edge parts also to be a right angle. Thus it is also simple to manufacture side plates 1a' by only deleting the rectangular pieces from the corners.

In the embodiments presented, the second basic part 2a is preferably formed by ¼ of a cylindrical surface and the fourth basic part 2c substantially of ⅛ of a spherical surface, correspondingly.

Figure 3:
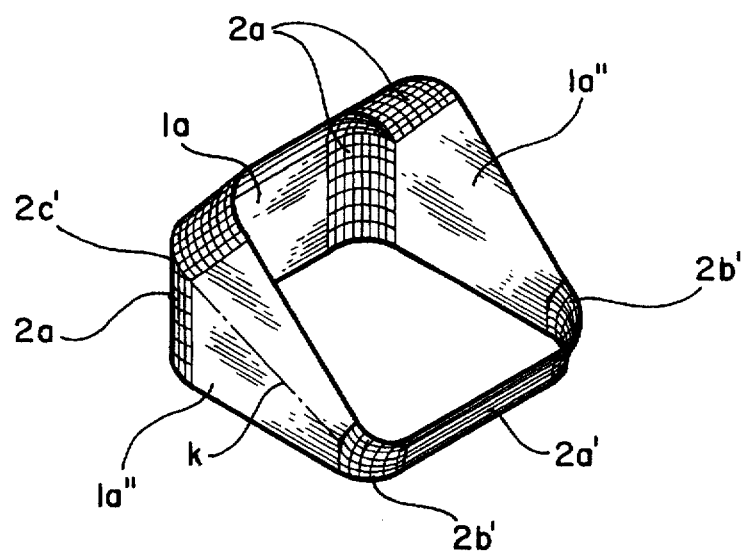
FIG. 3 shows a corner piece in a 45° angle.

FIG. 3 shows a corner piece corresponding to FIGS. 2a, 2b, the longitudinal directions deviating at an angle of 45°. Thus the fourth basic part 2c' is formed by 1/16 of a spherical surface; whereby the third basic part 2b' and the second basic part 2a' are arranged at an angle of 45° correspondingly. Both side plates 1a" are formed of hexagonal plates which are symmetrical in relation to their central line K.

Figure 4:
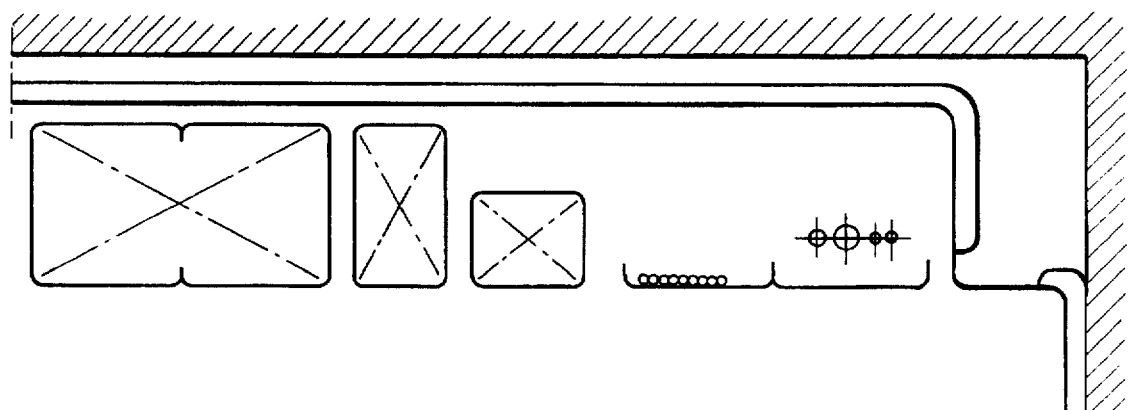
FIG. 4 shows a channel system with a uniform appearance, formed by a channel system of the present invention.

FIG. 4 shows a channel system with a uniform appearance, manufactured by the method of the present invention. This method can be used for manufacturing both, closed channels and partly open channels. Open channels can be used, as presented, as wiring channels or cover plates.

By the principle presented above, the method of the invention is thus used to form elements with different shapes by combining planar and arched wall parts suitably with each other in order to manufacture elements with different shapes. Thus, corresponding elements with different sizes in the channel system are manufactured by using the same basic parts, by changing the dimensions, such as the area and length, of the first and second basic parts are changed correspondingly.

It is obvious that the present invention is not limited to the embodiments presented above but it can be varied within the basic idea even to a great extent. For example, the corner piece shown in FIGS. 2a, 2b can be simply modified into a T-piece open in three directions. The basic parts can naturally be connected to each other by a variety of joining arrangements depending on the material used and the purpose of the channel in question. Thus, for example when sheet metal is used, the basic parts can be formed, for example, by a joining principle of the type mentioned in the beginning of the description above. In a corresponding manner, the joining arrangements can be arranged to be disassembled e.g. for forming various cover plates of temporary art. It is naturally the purpose of the channel that sets the requirements for the tightness and the like of the joining arrangement. Consequently, the channel system of the invention can be used in a variety of applications, manufactured of a variety of materials and by a variety of techniques.

I claim:

1. A thin wall system for providing a channel, comprising:

a plurality of planar basic parts for forming planar wall parts of said system, a plurality of arcuate basic parts which extend in a longitudinal direction and curve in a transverse direction for forming arched wall parts of said system, said arched wall parts being attached to said planar wall parts along their edges in the longitudinal direction for forming straight segments of said channel which includes rounded corners provided by said arched wall parts, and at least one corner piece for joining two straight segments of said channel at an angle with each other, said at least one corner piece comprising:

said planar basic parts attached to said arcuate basic parts to form walls, and curved basic pieces attached to said planar and arcuate basic parts to form corners in said corner piece.

2. The system according to claim 1, wherein said curved basic pieces comprise pieces for forming an inside corner and an outside corner in said corner piece.

3. The system according to claim 2, wherein a surface of each said curved basic piece forming said outside corner comprises one-eighth of a surface of a sphere having the same radius as said curved basic piece.

4. The system according to claim 1, wherein a surface of each said arcuate basic parts comprises one-fourth of a surface of a cylinder having the same radius as said arcuate basic part.

5. The system according to claim 1, wherein said arcuate basic parts and curved basic pieces include substantially the same radius of curvature at edges which join said arcuate basic parts with said curved basic pieces.

6. A method of manufacturing a thin wall channel system, comprising:

combining a multiple of planar basic parts to form planar wall parts of said system, combining a multiple of arcuate bask parts which extend in a longitudinal direction and curve in a transverse direction to form arched wall parts of said system, attaching said arched wall parts to said planar wall parts along edges in the longitudinal direction to form straight segments of a channel which includes rounded corners provided by said arched wall parts, and joining two straight segments at an angle with each other via a corner piece by attaching said planar basic parts to said arcuate basic parts to form walls in said corner piece and by attaching curved basic pieces to said planar basic parts and said arcuate basic parts to form corners in said corner piece.

7. A thin-walled channel system with rounded corners comprising:

first basic parts having planar shape, second basic parts having cylindrical shape and arched cross-section, straight channel elements of the channel system formed by joining together said first and second basic parts along their longitudinal edges to provide straight channel elements having a cross-section with rounded corners formed by the arched cross-section of the second basic parts, and corner pieces for accomplishing a joint between at least two of said straight channel elements having deviating longitudinal directions, each corner piece comprising:

first basic parts having planar shape, second basic parts having cylindrical shape and arched cross-section, and third and fourth basic parts having substantially curved shape, said corner piece having corners and being formed by joining the first and second basic parts together at their edges and by joining the third and fourth basic parts to at least some of the corners of the corner piece.

* * * * *